(12) United States Patent
Abe et al.

(10) Patent No.: US 10,392,983 B2
(45) Date of Patent: Aug. 27, 2019

(54) CONSTRUCTION MACHINE

(71) Applicant: Hitachi Construction Machinery Co., Ltd., Taito-ku, Tokyo (JP)

(72) Inventors: Shinya Abe, Tsuchiura (JP); Satoshi Suzuki, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/757,554

(22) PCT Filed: Sep. 5, 2016

(86) PCT No.: PCT/JP2016/075992
§ 371 (c)(1),
(2) Date: Mar. 5, 2018

(87) PCT Pub. No.: WO2017/149809
PCT Pub. Date: Sep. 8, 2017

(65) Prior Publication Data
US 2018/0245494 A1 Aug. 30, 2018

(30) Foreign Application Priority Data
Mar. 2, 2016 (JP) .................. 2016-039972

(51) Int. Cl.
 *E02F 9/08* (2006.01)
 *F01N 3/20* (2006.01)
 *B01D 53/94* (2006.01)
(52) U.S. Cl.
 CPC ......... *F01N 3/2013* (2013.01); *B01D 53/94* (2013.01); *E02F 9/0866* (2013.01);
 (Continued)
(58) Field of Classification Search
 CPC combination set(s) only.
 See application file for complete search history.

(56) References Cited

U.S. PATENT DOCUMENTS 7,647,767 B2 * 1/2010 Osaku ............... F01N 3/2066
 60/286
8,726,636 B2 * 5/2014 Zimmerman ......... F01N 3/208
 60/274
(Continued)

FOREIGN PATENT DOCUMENTS

JP 2008-248710 A 10/2008
JP 2012-225304 A 11/2012
(Continued)

OTHER PUBLICATIONS

International Search Report (PCT/ISA/210) issued in PCT Application No. PCT/JP2016/075992 dated Nov. 15, 2016 with English-language translation (five (5) pages).
(Continued)

*Primary Examiner* — Binh Q Tran
(74) *Attorney, Agent, or Firm* — Crowell & Moring LLP (57) ABSTRACT

A normal suction pipeline (27) through which urea water that is sucked from a urea water tank (22) toward a urea water pump (25) flows and a heater-equipped return pipeline (29) through which the urea water that is returned from the urea water pump (25) toward the urea water tank (22) flows are connected between the urea water tank (22) and the urea water pump (25). A supply pipeline (28) through which the urea water that is supplied toward a urea water injection valve (14) by the urea water pump (25) flows is connected between the urea water pump (25) and the urea water injection valve (14). The heater-equipped return pipeline (29) is equipped with a heating wire (29B) adapted to heat the urea water therein. The normal suction pipeline (27) is formed as a pipeline that is not equipped with the heater. The heater-equipped return pipeline (29) and the normal suction pipeline (27) are disposed in a state of contact with each other.

3 Claims, 6 Drawing Sheets

(52) U.S. Cl.
CPC ............ *E02F 9/0883* (2013.01); *F01N 3/206* (2013.01); *F01N 3/2066* (2013.01); *B01D 53/9409* (2013.01); *B01D 53/9477* (2013.01); *F01N 2590/08* (2013.01); *F01N 2610/02* (2013.01); *F01N 2610/10* (2013.01); *F01N 2610/105* (2013.01); *F01N 2610/14* (2013.01); *F01N 2610/1406* (2013.01); *F01N 2610/1433* (2013.01); *F01N 2610/1473* (2013.01); *F01N 2610/1486* (2013.01); *Y02A 50/2325* (2018.01); *Y02T 10/24* (2013.01)

(56) References Cited

U.S. PATENT DOCUMENTS

| | | | | |
|---|---|---|---|---|
| 8,881,507 | B2* | 11/2014 | Yan | F01N 3/2066 60/286 |
| 9,816,416 | B2* | 11/2017 | Furesawa | F01N 3/208 |
| 10,082,067 | B2* | 9/2018 | Yang | F01N 11/00 |
| 2004/0025498 | A1* | 2/2004 | Lambert | B01D 53/90 60/286 |
| 2015/0259878 | A1 | 9/2015 | Fujii et al. | |
| 2016/0123204 | A1 | 5/2016 | Furesawa | |
| 2017/0016375 | A1 | 1/2017 | Okada et al. | |

FOREIGN PATENT DOCUMENTS

| | | |
|---|---|---|
| JP | 2014-194171 A | 10/2014 |
| JP | 2015-175334 A | 10/2015 |
| JP | 2015-197079 A | 11/2015 |
| JP | 2016-132990 A | 7/2016 |
| WO | WO 2010/035355 A1 | 4/2010 |
| WO | WO 2012/078706 A2 | 6/2012 |
| WO | WO 2014/199778 A1 | 12/2014 |

OTHER PUBLICATIONS

Japanese-language Written Opinion (PCT/ISA/237) issued in PCT Application No. PCT/JP2016/075992 dated Nov. 15, 2016 (four (4) pages).

* cited by examiner

CONSTRUCTION MACHINE

TECHNICAL FIELD

The present invention relates to a construction machine such as a hydraulic excavator and the like with a urea water tank that stores urea water and a urea water pump that supplies the urea water in the urea water tank to an exhaust gas purifying device being mounted.

BACKGROUND ART

In general, the hydraulic excavator as a representative example of the construction machine comprising: an automotive vehicle body; an engine that is mounted on the vehicle body; an exhaust gas purifying device that is connected to an exhaust pipe of the engine and is provided with a urea selective reduction catalyst that removes a nitrogen oxide in an exhaust gas; a urea water injection valve that is provided in the exhaust gas purifying device and injects urea water that is a reducing agent to the upstream side of the urea selective reduction catalyst; a urea water tank that stores the urea water to be supplied to the urea water injection valve; a urea water pump that supplies the urea water that is stored in the urea water tank toward the urea water injection valve.

In this case, the urea water tank and the urea water pump are connected to each other via a suction pipeline through which the urea water that is sucked from the urea water tank toward the urea water pump flows and a return pipeline through which the urea water that is returned from the urea water pump toward the urea water tank flows. The urea water pump and the urea water injection valve are connected to each other via a supply pipeline through which the urea water that is supplied toward the urea water injection valve by the urea water pump flows.

A warming pipeline through which engine cooling water warmed by an engine flows is provided in the urea water tank and suppresses (defrosts) freezing of the urea water stored in the urea water tank (Patent Document 1). In addition, the one that uses the engine cooling water warmed by the engine and the one that uses a heater such as a heating wire and the like are known as the ones that suppress freezing of the urea water in the suction pipeline, the return pipeline, the supply pipeline.

PRIOR ART DOCUMENT

Patent Document

Patent Document 1: Japanese Patent Application Laid-Open No. 2012-225304 A

SUMMARY OF THE INVENTION

Incidentally, in a case where the engine cooling water is used for defrosting the urea water, it is necessary to drive the engine. In addition, since a sufficient time is necessary to warm the engine cooling water after driving of the engine, there is a possibility that the time may be taken to defrost the urea water. On the other hand, the heater such as the heating wire and the like is excellent in defrosting performance in comparison with a case of using the engine cooling water. However, since power consumption is increased, a large-capacity generator becomes necessary. Further, since the heating wire, a connector and the like become newly necessary, there is a possibility that a cost may be increased.

In view of the above-described problems with the conventional art, it is an object of the present invention to provide a construction device that is able to reduce the cost by efficiently suppressing freezing of the urea water.

The present invention is characterized in that a construction machine comprising: an automotive vehicle body; an engine that is mounted on the vehicle body; an exhaust gas purifying device that is connected to an exhaust pipe of the engine and includes a urea selective reduction catalyst that removes a nitrogen oxide in an exhaust gas; a urea water injection valve that is provided in the exhaust gas purifying device and injects urea water that is a reducing agent to the upstream side of the urea selective reduction catalyst; a urea water tank that stores the urea water to be supplied to the urea water injection valve; a urea water pump that supplies the urea water that is stored in the urea water tank toward the urea water injection valve; a suction pipeline that is provided so as to connect the urea water tank and the urea water pump to each other and through which the urea water that is sucked from the urea water tank toward the urea water pump flows; a return pipeline that is provided so as to connect the urea water pump and the urea water tank to each other and through which the urea water that is returned from the urea water pump toward the urea water tank flows; and a supply pipeline that is provided so as to connect the urea water pump and the urea water injection valve to each other and through which the urea water that is supplied toward the urea water injection valve by the urea water pump flows, characterized in that: the return pipeline is formed as a heater-equipped return pipeline that is equipped with a heater adapted to heat the urea water therein, the suction pipeline is formed as a normal suction pipeline that is not equipped with the heater, and the heater-equipped return pipeline and the normal suction pipeline are disposed in parallel in a state of contact with each other.

According to the present invention, it is possible to reduce the cost by efficiently suppressing freezing of the urea water.

MODE FOR CARRYING OUT THE INVENTION

Hereinafter, a construction machine according to an embodiment of the present invention will be described in detail with reference to FIG. 1 to FIG. 6 by taking a wheel-type hydraulic excavator as a representative example.

Figure 1:
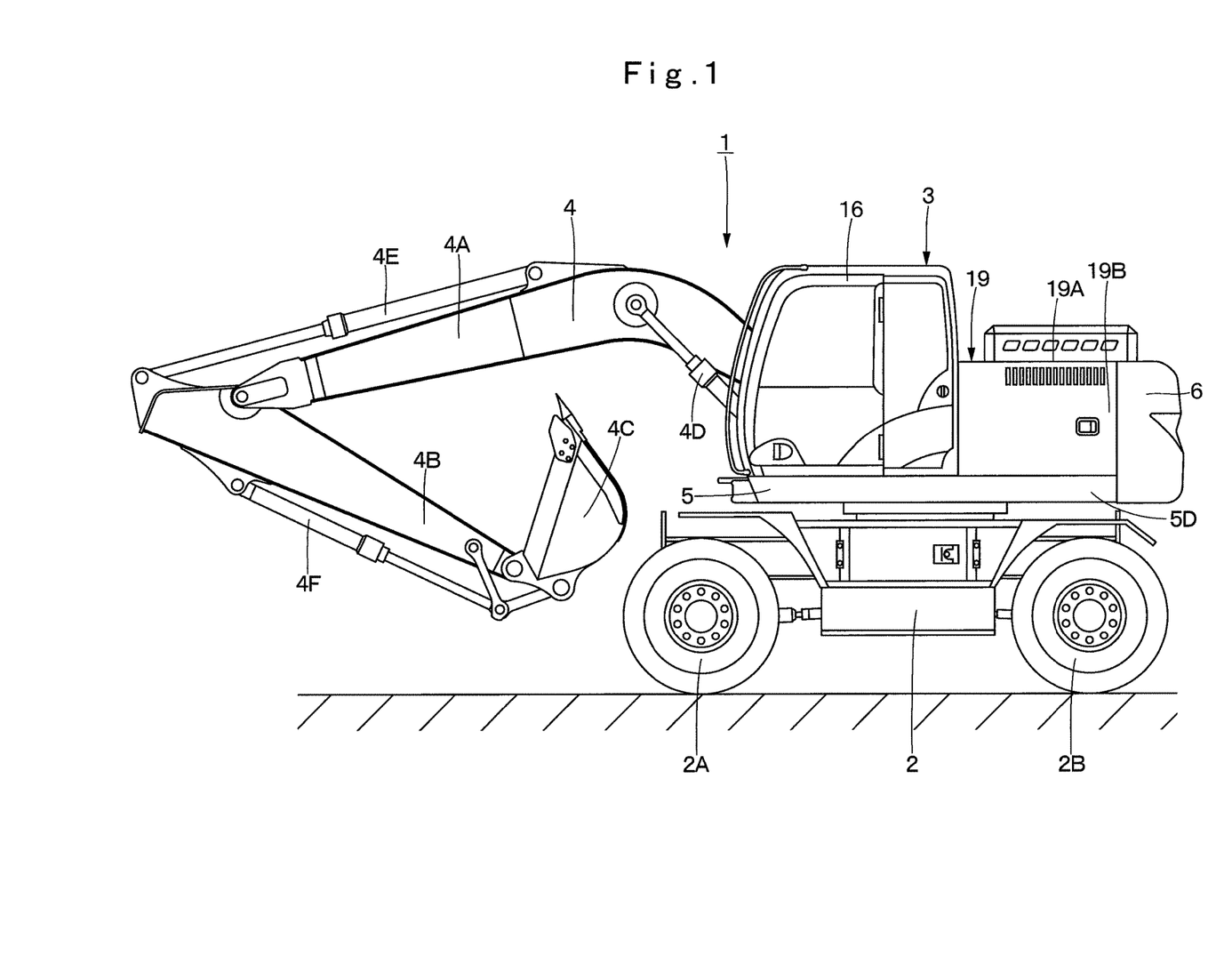
FIG. 1 is a front view showing a hydraulic excavator according to an embodiment of the present invention.

In FIG. 1, a hydraulic excavator 1 is configured by an automotive wheel-type lower traveling structure 2 having left and right front wheels 2A and left and right rear wheels 2B, an upper revolving structure 3 that is rotatably mounted on the lower traveling structure 2, and a front device 4 that is tiltably provided on the upper revolving structure 3. Here, the wheel-type hydraulic excavator 1 includes the lower traveling structure 2 and the upper revolving structure 3 and thereby a vehicle body of the present invention is configured.

Figure 2:
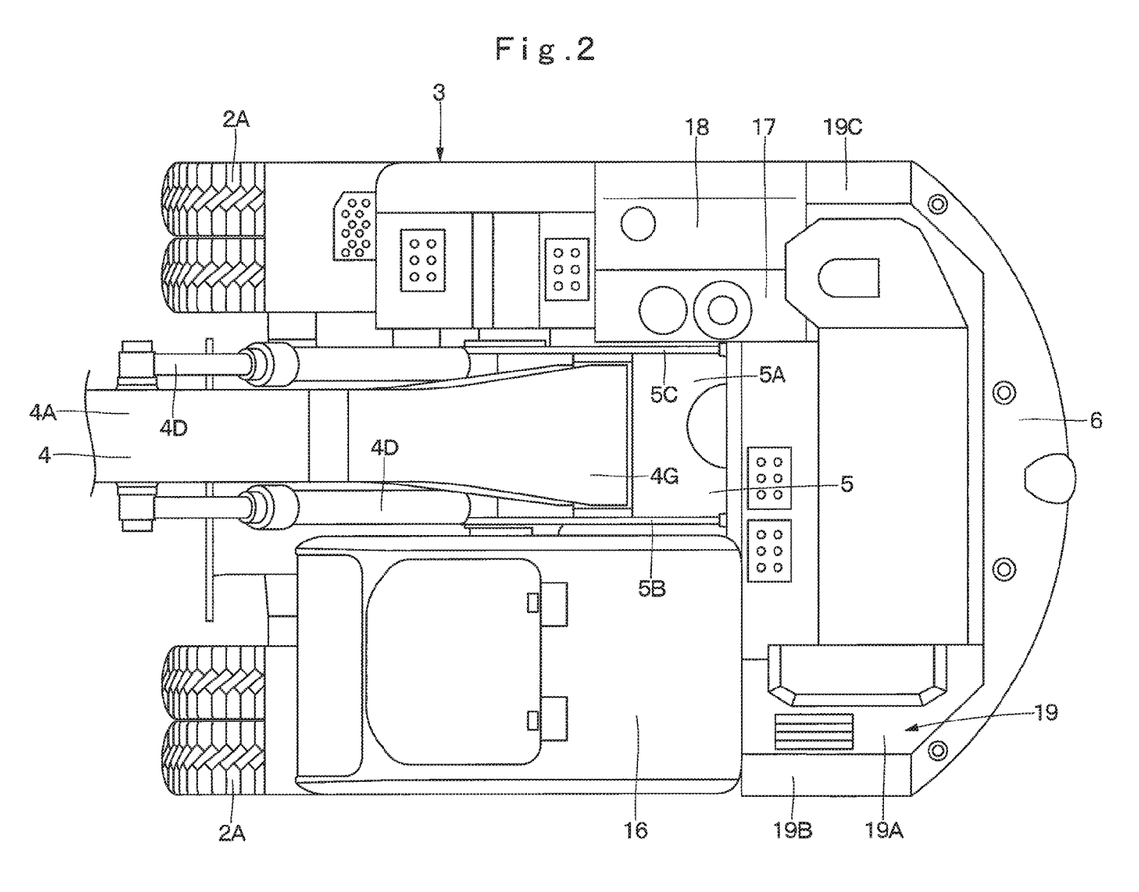
FIG. 2 is an enlarged plan view showing the hydraulic excavator that a part of a front device is omitted.

The front device 4 is configured by a boom 4A, an arm 4B, a bucket 4C, a boom cylinder 4D, an arm cylinder 4E, a bucket cylinder 4F and the like. A foot part 4G of the boom 4A is rotatably attached to an intermediate part in a left-right direction on the front side of a revolving frame 5 that will be described later as shown in FIG. 2.

Figure 3:
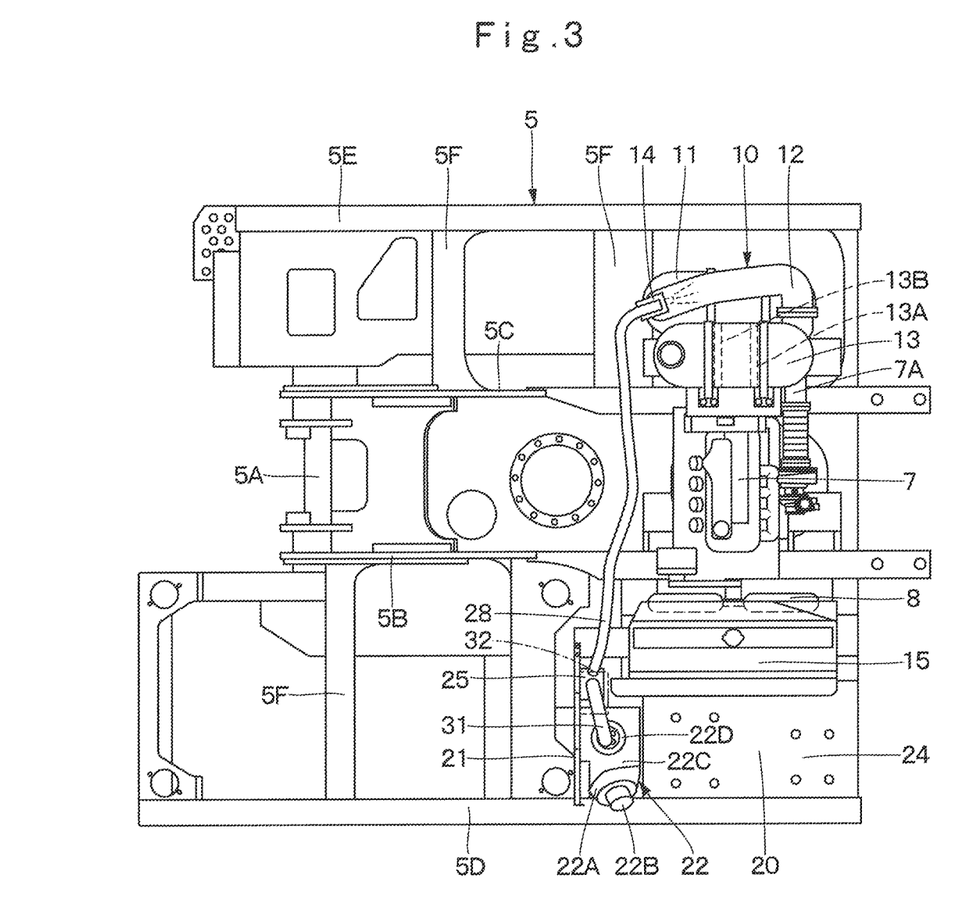
FIG. 3 is a plan view showing a revolving frame, an engine, a heat exchanger, an exhaust gas treatment device, a urea water tank, a urea water pump, a heat-insulating cover, a supply pipeline and the like in a state where an air cleaner is omitted.

The revolving frame 5 is the one that configures a support structure body of the upper revolving structure 3 and is rotatably mounted on the lower traveling structure 2 with the foot part 4G of the front device 4 being attached to the front side thereof. The revolving frame 5 is configured by including a bottom plate 5A that is composed of a thick steel plate and the like that extends in a front-rear direction, a left vertical plate 5B and a right vertical plate 5C that are installed upright on the bottom plate 5A and extending in the front-rear direction with a predetermined interval in the left-right direction, a left side frame 5D and a right side frame 5E that are disposed on the left and the right of the respective vertical plates 5B, 5C with an interval and extending in the front-rear direction, and a plurality of extension beams 5F that extend from the bottom plate 5A, each of the vertical plates 5B, 5C in the left-right direction respectively and support the left and right side frames 5D, 5E at leading end parts thereof respectively as shown in FIG. 3. The front device 4 (the foot part 4G) is tiltably mounted to the front sides of each of the vertical plates 5B, 5C and a counterweight 6 that will be described later is attached to the rear sides thereof.

The counterweight 6 is provided on rear ends of the left and right vertical plates 5B, 5C that configure the revolving frame 5. This counterweight 6 acts as a weight balance to the front device 4. A rear surface of the counterweight 6 is formed into a substantially arc shape centering on a revolving center of the upper revolving structure 3 (see FIG. 2).

An engine 7 is located on the front side of the counterweight 6 and is provided on the rear part of the revolving frame 5. This engine 7 is mounted on horizontally placed state where it extends in the left-right direction as shown in FIG. 3. A cooling fan 8 that sucks outdoor air as cooling air is disposed on the left side that is the one side in the left-right direction of the engine 7. On the other hand, a hydraulic pump (not shown) is disposed on the right side that is the other side in the left-right direction of the engine 7, located on the lower side of an exhaust gas purifying device 10 that will be described later. The hydraulic pump is adapted to supply pressurized oil toward various kinds of hydraulic actuators provided in the upper revolving structure 3, the front device 4 by being driven by the engine 7.

In addition, a not shown intake pipe is connected to the intake side of the engine 7 and an air cleaner 9 is attached to the distal end side of this intake pipe. This air cleaner 9 is disposed in a heat exchanger upstream room 20 that will be described later, centrifuges dust in sucked air and makes only purified air flow to the engine 7. On the other hand, an exhaust pipe 7A is connected to the exhaust side of the engine 7.

The exhaust gas purifying device 10 is connected to the exhaust pipe 7A of the engine 7. This exhaust gas purifying device 10 is located on the right side of the engine 7 and is disposed above the hydraulic pump. The exhaust gas purifying device 10 is adapted to remove hazardous substances in an exhaust gas emitted from the engine 7. In addition, the exhaust gas purifying device 10 is equipped with a silencing mechanism adapted to reduce noises of the exhaust gas. The exhaust gas purifying device 10 is configured by including a first exhaust gas post-treatment device 11, a connecting pipe 12, a second exhaust gas post-treatment device 13.

The first exhaust gas post-treatment device 11 is connected to the exit side of the exhaust pipe 7A. This first exhaust gas post-treatment device 11 is composed of a cylindrical body that extends in the front-rear direction and is disposed above the hydraulic pump and below the second exhaust gas post-treatment device 13 that will be described later. An oxidation catalyst (not shown) that is composed of, for example, a cell-type tubular body which is made from ceramics is provided in the first exhaust gas post-treatment device 11.

Many numbers of through-holes are formed in an axial direction in this oxidation catalyst and an inner surface is coated with a noble metal. The oxidation catalyst is adapted to oxidize and remove carbon monoxide (CO), hydrocarbon (HC) and the like contained in the exhaust gas by making the exhaust gas flow through the through-holes under a predetermined temperature. In addition, it is adapted to burn and remove particulate matters (PM) as necessary.

The connecting pipe 12 is disposed above the first exhaust gas post-treatment device 11, extending in the front-rear direction. The connecting pipe 12 is adapted to make a connection between the first exhaust gas post-treatment device 11 and the second exhaust gas post-treatment device 13. Specifically, the connecting pipe 12 is connected to the front end side (the downstream side of a flowing direction of the exhaust gas) of the first exhaust gas post-treatment device 11 and to the rear end side (the upstream side of the flowing direction of the exhaust gas) of the second exhaust gas post-treatment device 13. In addition, a urea water injection valve 14 that will be described later is provided on the front end side (the upstream side of the flowing direction of the exhaust gas) of the connecting pipe 12.

The second exhaust gas post-treatment device 13 is disposed on the left upper side of the first exhaust gas post-treatment device 11. This second exhaust gas post-treatment device 13 is connected to the exit side of the connecting pipe 12 and is formed as a cylindrical body that extends in the front-rear direction in parallel with the first exhaust gas post-treatment device 11. A urea selective reduction catalyst 13A and an oxidation catalyst 13B are disposed in the second exhaust gas post-treatment device 13 (see FIG. 3).

The urea selective reduction catalyst 13A is composed of, for example, a cell-type tubular body which is made from ceramics, many numbers of through-holes are formed therein in an axial direction thereof and an inner surface is coated with the noble metal. The urea selective reduction catalyst 13A makes a nitrogen oxide (NOx) that is in general contained in the exhaust gas emitted from the engine 7 selectively undergo a reduction reaction with ammonia generated from a urea water solution and decomposes it into nitrogen and water.

The oxidation catalyst 13B is provided on the more downstream side of the flowing direction of the exhaust gas than the urea selective reduction catalyst 13A. This oxidation catalyst 13B is composed of a cell-type tubular body which is made from ceramics, many numbers of throughholes are formed therein in an axial direction thereof and an inner surface is coated with the noble metal substantially similarly to the oxidation catalyst of the aforementioned first exhaust gas post-treatment device 11. Thereby, the oxidation catalyst 13B oxidizes remaining ammonia that remains after reducing the nitrogen oxide by the urea selective reduction catalyst 13A and decomposes it into nitrogen and water.

The urea water injection valve 14 is provided on the front end side of the connecting pipe 12. This urea water injection valve 14 is connected to a urea water tank 22 that will be described later and stores the urea water solution via a urea water pump 25, a normal suction pipeline 27, a supply pipeline 28. The urea water injection valve 14 is adapted to inject the urea water that is a reducing agent to the more upstream side than the urea selective reduction catalyst 13A toward the exhaust gas that flows in the connecting pipe 12.

A heat exchanger 15 is disposed facing the cooling fan 8 so as to locate on the upstream side of a flowing direction of cooling air by the cooling fan 8. This heat exchanger 15 is configured by, for example, a radiator that cools the engine cooling water, an oil cooler that cools a hydraulic oil, an intercooler that cools air that the engine 7 sucks and the like. The heat exchanger 15 is covered with a housing 19 that will be described later together with the engine 7, the hydraulic pump and the like.

A cab 16 is located on the left side with the foot part 4G of the front device 4 being interposed and is provided on the revolving frame 5. This cab 15 is the one on which an operator will get on and a driver's seat on which the operator will sit, a steering wheel used for traveling, an operation lever used for work and the like (any of them is not shown) are disposed therein. Further, key switches (not shown) used for operating on/off switching of an electrical system of the hydraulic excavator 1, start and stop of the engine 7 and the like are disposed in the vicinity of the driver's seat.

A hydraulic oil tank 17 is located on the front side of the engine and on the right side with the foot part 4G of the front device 4 being interposed and is provided on the revolving frame 5. This hydraulic oil tank 17 is adapted to store hydraulic oil to be supplied to various kinds of actuators mounted on the hydraulic excavator 1. On the other hand, a fuel tank 18 is provided on the revolving frame 5 adjacent to the right side of the hydraulic oil tank 17. This fuel tank 18 is adapted to store fuel to be supplied to the engine 7.

The housing 19 is located on the rear side of the upper revolving structure 3 and is provided on the revolving frame 5. This housing 19 is located around the counterweight 6, the cab 16, the hydraulic oil tank 17 and the fuel tank 18 and is adapted to cover mounted devices including the engine 7, the heat exchanger 15 and the like. The housing 19 is configured by a top surface cover 19A that covers over the engine 7, the heat exchanger 15 and the like, a left side cover 19B that falls from a left end of the top surface cover 19A so as to face the heat exchanger 15, and a right side cover 19C that falls from a right end of the top surface cover 19A.

The left side cover 19B is disposed on one side surface in the left-right direction of the revolving frame 5, that is, on the left side frame 5D so as to be openable/closable with, for example, a front part being set as a fulcrum. That is, the left side cover 19B is attached to a partition plate 21 that will be described later via a hinge (not shown) and thereby closes the left side of the heat exchanger upstream room 20 that will be described later to be openable/closable.

The heat exchanger upstream room 20 is the one that is provided between the cab 16 and the counterweight 6. That is, the heat exchanger upstream room 20 is provided on the more upstream side than the heat exchanger 15 relative to the flowing direction of the cooling air to be supplied to the heat exchanger 15. This heat exchanger upstream room 20 is a space surrounded by the housing 19, the partition plate 21 that will be described later and the counterweight 6.

Figure 4:
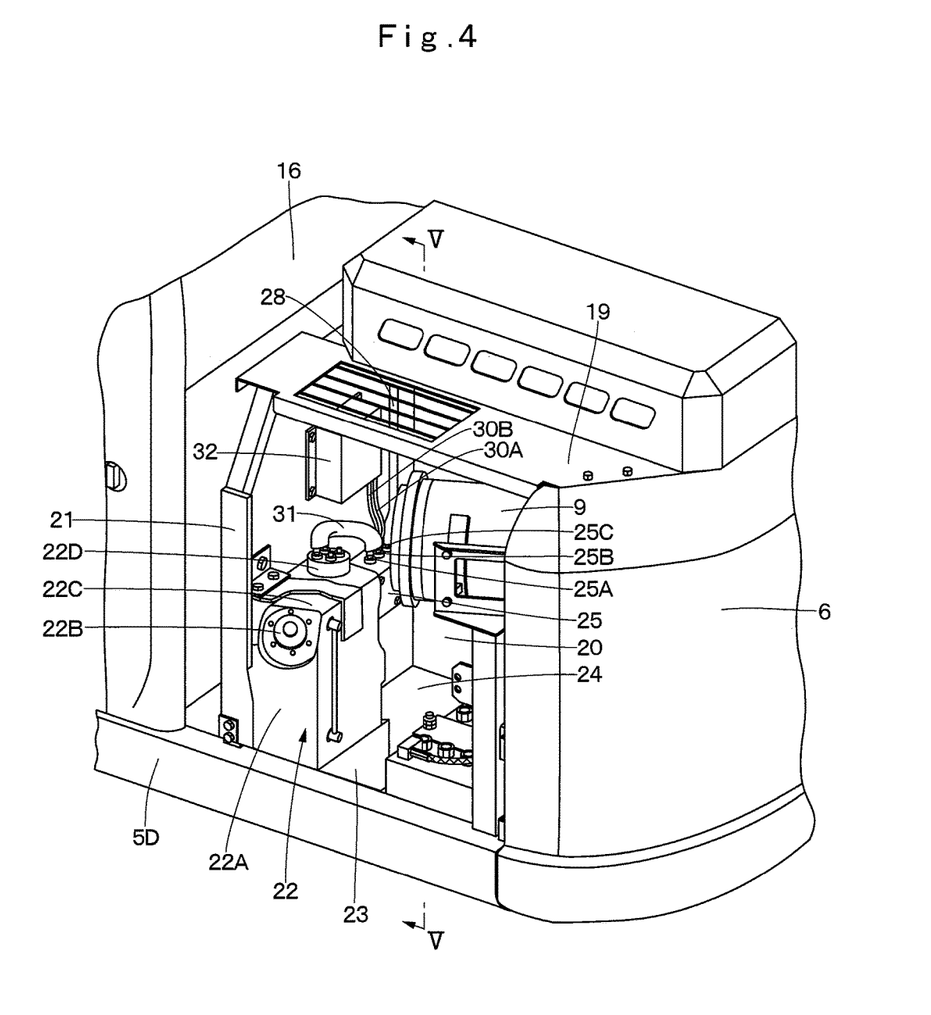
FIG. 4 is a perspective view showing a cab, a counter weight, a partition plate, the urea water tank, the urea water pump, the heat-insulating cover, the supply pipeline and the like viewed from left rear in a state where a left side cover is removed.

Specifically, the heat exchanger upstream room 20 is closed with the top surface cover 19A of the housing 19 on its top, is closed with the partition plate 21 on its front and is closed with the counterweight 6 on its rear. In addition, the left of the heat exchanger upstream room 20 is closed with the left side cover 19B to be openable/closable. On the other hand, the heat exchanger 15 is disposed on the right of the heat exchanger upstream room 20. Further, the air cleaner 9 is disposed in the heat exchanger upstream room 20 as shown in FIG. 4.

The partition plate 21 forms a partition between the heat exchanger upstream room 20 and the cab 16. This partition plate 21 is located between a front part of the heat exchanger 15 and a rear surface of the cab 16 and is disposed upright on the revolving frame 5, extending in the left-right direction. Conduction of heat, noises and the like generated from the engine 7 to the inside of the cab 16 is prevented by this partition plate 21.

The urea water tank 22 is located in the heat exchanger upstream room 20 and is provided on the revolving frame 5. This urea water tank 22 is adapted to store the urea water to be supplied to the urea water injection valve 14 provided in the connecting pipe 12 of the exhaust gas purifying device 10. The urea water tank 22 is accommodated in a tank receiver 23 and is disposed on the front side of the heat exchanger upstream room 20. An undercover 24 is provided on the lower side of the urea water tank 22.

A water supply port 22B through which the urea water is supplied is provided on the upper end side of a left plate 22A of the urea water tank 22. Thereby, it is possible to supply the urea water with ease through the water supply port 22B in the urea water tank 22 by opening the left side cover 19B.

In addition, a lid member 22D is provided on a top plate 22C of the urea water tank 22. The normal suction pipeline 27 and a heater-equipped return pipeline 29 that will be described later are connected to this lid member 22D. In addition, for example, a liquid gage (not shown) that measures a liquid volume of the urea water in the urea water tank 22 and a heater (not shown) that defrosts the urea water in the urea water tank 22 and the like are attached to the lid member 22D.

The urea water pump 25 is disposed more rightward than the urea water tank 22 in the heat exchanger upstream room 20. Specifically, the urea water pump 25 is disposed on the right of the urea water tank 22 and is attached to the partition plate 21 with three bolts 26.

A suction port 25A, a return port 25B, a supply port 25C are provided in an upper surface of the urea water pump 25 from the left side separately each other in the left-right direction. The normal suction pipeline 27 that will be described later is connected to the suction port 25A and the heater-equipped return pipeline 29 that will be described later is connected to the return port 25B. In addition, the supply pipeline 28 that will be described later is connected to the supply port 25C. In addition, cables (not shown) such as an electric wire, a signal line and the like are connected to the urea water pump 25. The urea water pump 25 is adapted to supply the urea water stored in the urea water tank 22 toward the urea water injection valve 14. A control valve (not shown) that is opened and closed by a controller 32 is provided in the return port 25B. This control valve is closed when reversely driving the urea water pump 25.

Figure 5:
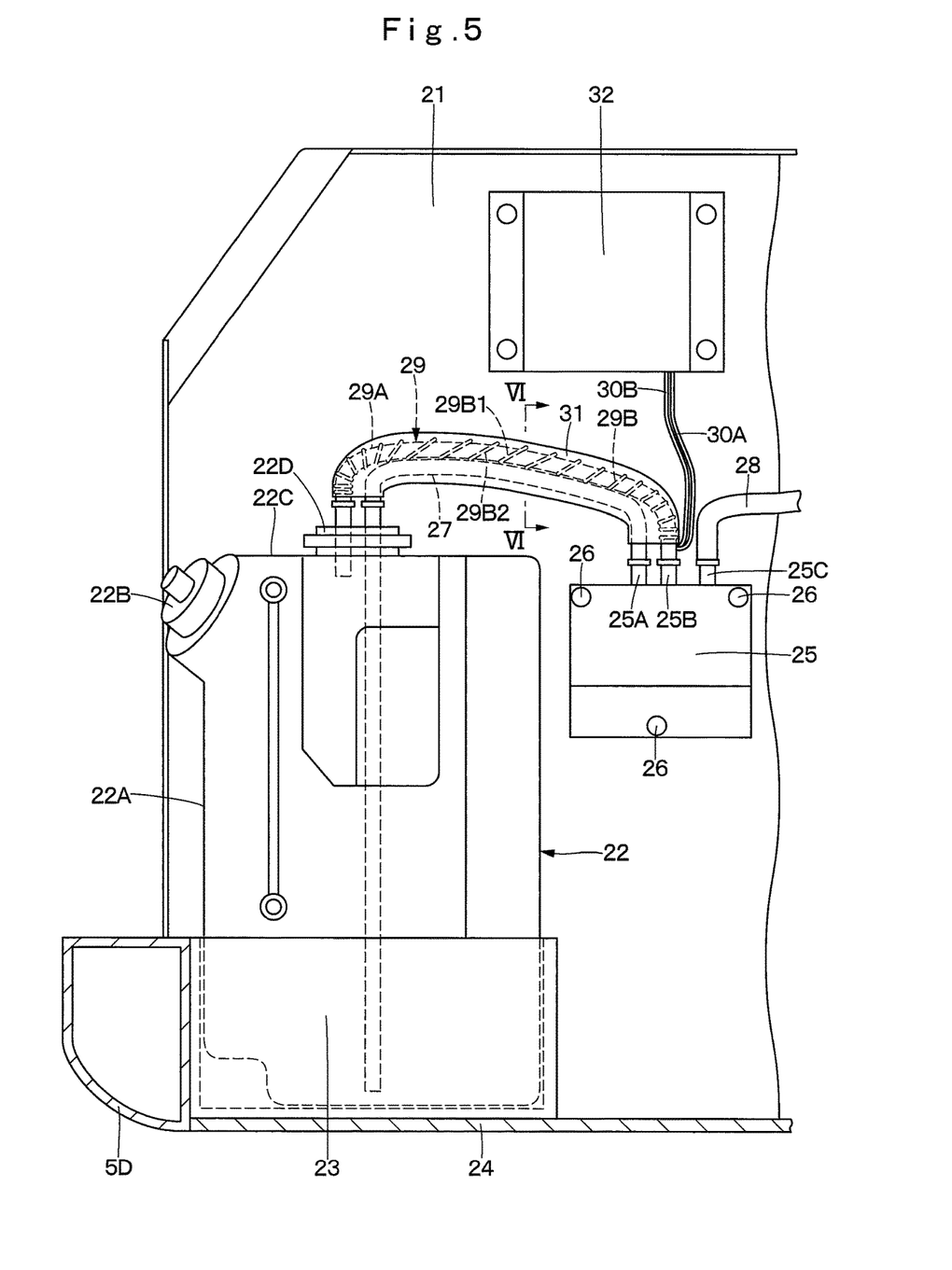
FIG. 5 is a sectional view showing the partition plate, the urea water tank, the urea water tank, a normal suction pipeline, a heater-equipped return pipeline, the supply pipeline, the heat-insulating cover and the like viewed in the direction of an arrow V-V in FIG. 4.

The normal suction pipeline 27 is provided so as to connect the urea water tank 22 and the urea water pump 25 to each other. This normal suction pipeline 27 is formed as a resinous pipe body that is not equipped with a heating wire 29B that will be described later and is the one through which the urea water sucked from the urea water tank 22 toward the urea water pump 25 flows. The normal suction pipeline 27 extends in the left-right direction as a whole as shown in FIG. 5. The left end side of the normal suction pipeline 27 is connected to the lid member 22D of the urea water tank 22 and extends toward a lower part (a bottom part) in the urea water tank 22. On the other hand, the right end side of the normal suction pipeline 27 is connected to the suction port 25A in the urea water pump 25.

The supply pipeline 28 is provided so as to connect the urea water pump 25 and the urea water injection valve 14 to each other. The urea water to be supplied toward the urea water injection valve 14 by the urea water pump 25 flows through this supply pipeline 28. The supply pipeline 28 is composed of, for example, a resinous pipe body, the one end side is connected to the supply port 25C in the urea water pump 25 and the other end side is connected to the urea water injection valve 14 as shown in FIG. 3, FIG. 5.

For example, a not shown heating wire for the supply pipeline is wound on an outer periphery of the supply pipeline 28 and generates heat in accordance with a command from the controller 32 that will be described later. Thereby, freezing of the urea water that flows in the supply pipeline 28 is suppressed with heat of the heating wire for the supply pipeline. It should be noted that, the engine cooling water that is warmed by the engine 7 in place of the heating wire for the supply pipeline may be used in the supply pipeline 28.

The heater-equipped return pipeline 29 is provided so as to connect the urea water pump 25 and the urea water tank 22 to each other. This heater-equipped return pipeline 29 is composed of, for example, a resinous pipe body and is configured by a return pipeline 29A through which the urea water that is returned from the urea water pump 25 toward the urea water tank 22 flows and the heating wire 29B that is wound on the outer circumference of the return pipeline 29A serving as a heater.

The heater-equipped return pipeline 29 extends in the left-right direction as a whole as shown in FIG. 5. The left end side of the heater-equipped return pipeline 29 is connected to the lid member 22D of the urea water tank 22 and projects into the urea water tank 22. On the other hand, the right end side of the heater-equipped return pipeline 29 is connected to the return port 25B in the urea water pump 25.

The heating wire 29B is composed of, for example, a nickel-chrome wire, a ferrochrome wire and the like. The heating wire 29B is configured by a plus-side heating wire 29B1 that is helically wound on an outer circumference of the return pipeline 29A from the right end side (the return port 25B side of the urea water pump 25) toward the left end side (the lid member 22D side of the urea water tank 22) of the return pipeline 29A and a minus-side heating wire 29B2 that is helically wound on the outer circumference of the return pipeline 29A toward the right end side by being folded back on the left end side of the return pipeline 29A. That is, the heating wire 29B is, the plus-side heating wire 29B1 and the minus-side heating wire 29B2 are alternately wound (see FIG. 5, FIG. 6).

The plus-side heating wire 29B1 of the heating wire 29B is connected to a conductive wire 30A and this conductive wire 30A is connected to a power source via a control board in the controller 32. On the other hand, the minus-side heating wire 29B2 is connected with a conductive wire 30B and this conductive wire 30B is connected to a body earth via the control board in the controller 32. The heating wire 29B generates heat by supply of electric power from the power source in accordance with a command from the controller 32 that will be described later. The heat generated from the heating wire 29B is conducted to the urea water in the return pipeline 29A and thereby it is possible to defrost the frozen urea water. That is, the heater-equipped return pipeline 29 has a defrosting performance that makes defrosting of the frozen urea water possible.

Figure 6:
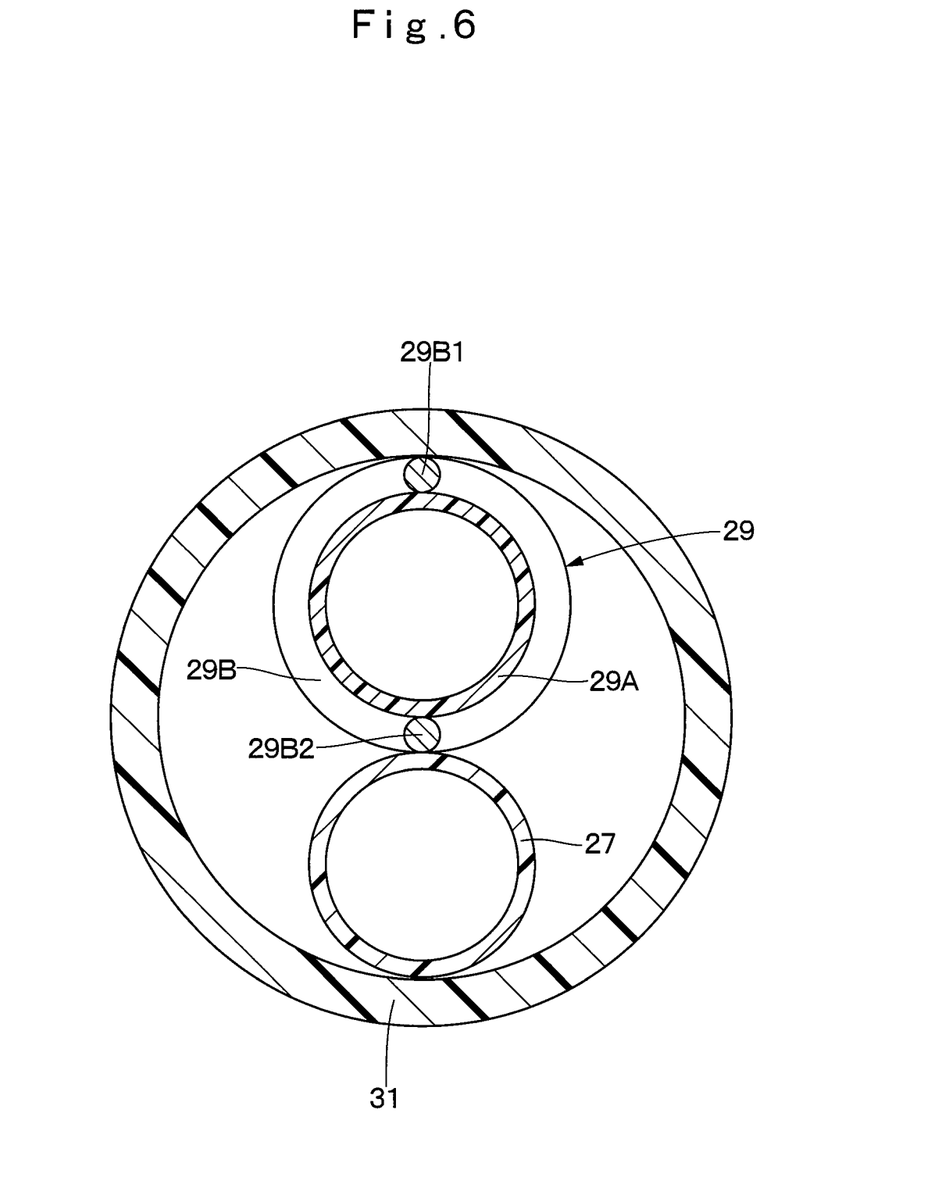
FIG. 6 is a sectional view showing the normal suction pipeline, the heater-equipped return pipeline, the heat-insulating cover in FIG. 5 viewed in the direction of an arrow VI-VI.

The heater-equipped return pipeline 29 id disposed along the normal suction pipeline 27 as shown in FIG. 5, FIG. 6. That is, the heater-equipped return pipeline 29 and the normal suction pipeline 27 are disposed in parallel in a state of contact with each other. Thereby, it is possible to suppress freezing of the urea water by conducting the heat generated from the heating wire 29B to the urea water in the normal suction pipeline 27. That is, the normal suction pipeline 27 has a warm-keeping performance that makes warm-keeping of the urea water that flows in the normal suction pipeline 27 possible.

A heat-insulating cover 31 is provided between the urea water tank 22 and the urea water pump 25. This heat-insulating cover 31 is formed as a pipe body made of, for example, polyethylene, polypropylene and the like. The heat-insulating cover 31 is adapted to surround the heater-equipped return pipeline 29 and the normal suction pipeline 27 together.

The heat-insulating cover 31 is adapted to efficiently keep the heat generated from the heating wire 29B warm by shutting off the heating wire 29B from the outdoor air. Since diffusion of the heat generated from the heating wire 29B is suppressed by the heat-insulating cover 31, it is possible to lower a temperature of the heating wire 29B and to shorten a winding length of the heating wire 29B in comparison with a case where the heat-insulating cover 31 is not used. Thereby, since it is possible to efficiently perform defrosting of the heater-equipped return pipeline 29 and warm-keeping of the normal suction pipeline 27, it is possible to reduce a cost.

The controller 32 is located above the urea water tank 22 and the urea water pump 25 and is attached to the partition plate 21. This controller 32 is connected to the exhaust gas purifying device 10, the urea water injection valve 14, the urea water tank 22, the urea water pump 25 and the like via, for example, not shown signal lines. The controller 32 is adapted to perform on-off valve control of the urea water injection valve 14 and control of driving of the urea water pump 25 and the like in accordance with an operation condition (for example, a displacement volume of the exhaust gas and the like) of the hydraulic excavator 1. In addition, the controller 32 controls heat generation of the heating wire for the supply pipeline and further controls heat generation of the heating wire 29B via the conductive wires 30A, 30B depending on, for example, an outdoor air temperature, a water temperature of the urea water and the like.

The hydraulic excavator 1 according to the present embodiment has such a configuration as described above and next, operations of this hydraulic excavator 1 will be described.

The operator gets on the cab 16 and sits on the driver's seat. The engine 7 is started to drive the hydraulic pump by operating the key switch in this state. The hydraulic pump is driven and pressurized oil that serves as the power source is secured. Then, the operator is able to drive the lower traveling structure 2 so as to move the hydraulic excavator 1 forward or backward by operating an accelerator pedal and the steering wheel that are used for traveling. On the other hand, the operator who sits on the driver's seat is able to perform earth and sand excavation work and the like by operating the operation lever for work and thereby tiltably moving the front device 4.

In this case, the exhaust gas emitted from the engine 7 is purified by the exhaust gas purifying device 10 and is emitted into the atmosphere. Specifically, the exhaust gas emitted from the engine 7 is, carbon monoxide (CO), hydrocarbon (HC) and the like contained in the exhaust gas are removed by the first exhaust gas post-treatment device 11. Subsequently, the exhaust gas is hydrolyzed with the urea water injected from the urea water injection valve 14 in the connecting pipe 12 and thereby ammonia is generated. Thereafter, the exhaust gas is emitted into the atmosphere after the nitrogen oxide (NOx) is made to selectively undergo reduction reaction with the ammonia generated from the urea water solution and is decomposed into nitrogen and water by the second exhaust gas post-treatment device 13.

Next, driving control of the urea water pump 25 that the controller 32 performs will be described.

First, when the operator starts the engine 7 by turning the key switch on, the controller 32 determines the state (freezing, a filling amount and the like) of the urea water in the urea water tank 22. When the controller 32 determines that there is no trouble in the state of the urea water, the controller 32 makes driving of the urea water pump 25 start.

When driving of the urea water pump 25 is started, the urea water in the urea water tank 22 circulates and flows through the normal suction pipeline 27, the urea water pump 25, the heater-equipped return pipeline 29. In this case, part of the urea water flows from the urea water pump 25 into the supply pipeline 28 and is supplied to the urea water injection valve 14.

The controller 32 determines whether a pressure in the supply pipeline 28 reaches a predetermined value or not with the inside of the supply pipeline 28 being filled with the urea water. When the controller 32 determines that the pressure in the supply pipeline 28 reaches the predetermined value, the controller 32 performs control of the on-off value of the urea water injection valve 14 in accordance with the exhaust volume of the exhaust gas and the like. Thereby, the urea water is injected into the exhaust gas that flows in the connecting pipe 12 of the exhaust gas purifying device 10.

On the other hand, when the operator stops driving of the engine 7 by turning the switch key off, the controller 32 stops driving of the urea water pump 25. Subsequently, the controller 32 closes the control valve of the return port 25B in the urea water pump 25 and starts reverse driving of the urea water pump 25.

Thereby, the urea water that remains in the normal suction pipeline 27 and in the supply pipeline 28 is returned to the urea water tank 22. Accordingly, it is possible to suppress remaining of the urea water in the normal suction pipeline 27 and in the supply pipeline 28 when the vehicle body is stopped. Thereafter, the controller 32 stops the reverse driving of the urea water pump 25.

Incidentally, there is a possibility that it may be impossible to return the urea water in the return pipeline to the urea water tank when the vehicle body is stopped in the above-described prior art. In this case, for example, when the temperature reaches a urea water freezing point or below (for example, −11° C.), the urea water freezes. In particular, since the urea water in the return pipeline is small in residual amount in comparison with a storage amount of the urea water in the urea water tank, there is a possibility that the urea water may freeze in a short period of time.

When the urea water pump is driven in a state where the urea water that remains in the return pipeline freezes, it is not possible to make the urea water smoothly circulate (flow) and there is a possibility that it may become impossible to appropriately perform control of exhaust gas purification treatment.

Whereas, the heating wire 29B is wound on the outer periphery of the return pipeline 29A to form the return pipeline 29A as the heater-equipped return pipeline 29 in the present embodiment. On the other hand, the suction pipeline is formed as the normal suction pipeline 27 that is not equipped with the heating wire (the heater). The heater-equipped return pipeline 29 and the normal suction pipeline 27 are disposed in parallel in the state of contact with each other.

Thereby, the heater-equipped return pipeline 29 has the sufficient defrosting performance owing to the heating wire 29B. On the other hand, the normal suction pipeline 27 is disposed in the state of contact with the heating wire 29B that is wound on the outer circumference of the return pipeline 29A and therefore it is possible to have the sufficient warm-keeping performance. Accordingly, for example, when the vehicle body is stopped in a work site where the outdoor air temperature reaches −11° C. or below, it is possible to defrost the frozen urea water with the heat generated from the heating wire 29B that is wound on the outer circumference of the return pipeline 29A irrespective of freezing of the urea water that remains in the return pipeline 29A.

On the other hand, when the outdoor air temperature approaches −11° C. in operation of the vehicle body, the heating wire 29B generates heat and thereby it is possible to keep the return pipeline 29A warm. Further, since the normal suction pipeline 27 is disposed in parallel with the heater-equipped return pipeline 29 in the state of contact with each other, warm-keeping thereof is possible. Thereby, it is possible to suppress freezing of the urea water that flows in the return pipeline 29A and the normal suction pipeline 27.

That is, since the normal suction pipeline 27 is warmed by the heating wire 29B of the heater-equipped return pipeline 29, it is possible to suppress freezing of the urea water that flows in the normal suction pipeline 27. Accordingly, it is possible for the normal suction pipeline 27 to efficiently secure the warm-keeping performance by using the heating wire 29B of the heater-equipped return pipeline 29 without using a dedicated heating wire (the heater). Consequently, it is possible to reduce the power consumption and therefore it is possible to reduce the cost.

Further, the heater-equipped return pipeline 29 and the normal suction pipeline 27 are surrounded together by the heat-insulating cover 31. Thereby, since a warm-keeping state of the heat generated from the heating wire 29B is improved in the heat-insulating cover 31, it is possible to lower the temperature of the heating wire 29B and to shorten the length of the heating wire 29B in comparison with a case of not using the heat-insulating cover 31 and it is possible to more reduce the cost.

It should be noted that the aforementioned first embodiment is explained by taking a case where the urea water tank 22 and the urea water pump 25 are disposed in the heat exchanger upstream room 20 as an example. However, the present invention is not limited thereto but the urea water pump 25 and the urea water tank 22 may be provided, for example, on the revolving frame 5 other than the heat exchanger upstream room 20.

In addition, in the above-described embodiment is explained by taking a case where the urea water tank 22 and the urea water pump 25 are attached to the partition plate 21 as an example. However, the present invention is not limited thereto, but the urea water tank 22 and the urea water pump 25 may be disposed, for example, on the counterweight 6 side.

In addition, in the above-described embodiment is explained by taking the small revolving type wheel-system hydraulic excavator 1 as an example as the construction machine. However, the present invention is not limited thereto, but it is widely applicable also to other construction machines such as, for example, a crawler mounted hydraulic excavator, a hydraulic crane and the like. Further, it is applicable also to an electric powered construction machine that drives the hydraulic pump by an electric motor and a hybrid-type construction machine with the engine and the electric motor being mounted.

DESCRIPTION OF REFERENCE NUMERALS

1: Hydraulic excavator (Construction machine)
2: Lower traveling structure (Vehicle body)
3: Upper revolving structure (Vehicle body)
7: Engine
7A: Exhaust pipe
10: Exhaust gas purifying device
13A: Urea selective reduction catalyst
14: Urea water injection valve
22: Urea water tank
25: Urea water pump
27: Normal suction pipeline (Suction pipeline)
28: Supply pipeline
29: Heater-equipped return pipeline
29A: Return pipeline
29B: Heating wire (Heater)
31: Heat-insulating cover

The invention claimed is:

1. A construction machine comprising:
an automotive vehicle body;
an engine that is mounted on said vehicle body;
an exhaust gas purifying device that is connected to an exhaust pipe of said engine and includes a urea selective reduction catalyst that removes a nitrogen oxide in an exhaust gas;
a urea water injection valve that is provided in said exhaust gas purifying device and injects urea water that is a reducing agent to the upstream side of said urea selective reduction catalyst;
a urea water tank that stores the urea water to be supplied to said urea water injection valve;
a urea water pump that supplies the urea water that is stored in said urea water tank toward said urea water injection valve;
a suction pipeline that is provided so as to connect said urea water tank and said urea water pump to each other and through which the urea water that is sucked from said urea water tank toward said urea water pump flows;
a return pipeline that is provided so as to connect said urea water pump and said urea water tank to each other and through which the urea water that is returned from said urea water pump toward said urea water tank flows; and
a supply pipeline that is provided so as to connect said urea water pump and said urea water injection valve to each other and through which the urea water that is supplied toward said urea water injection valve by said urea water pump flows, characterized in that:
said return pipeline is formed as a heater-equipped return pipeline that is equipped with a heater adapted to heat the urea water therein,
said suction pipeline is formed as a normal suction pipeline that is not equipped with said heater, and
said heater-equipped return pipeline and said normal suction pipeline are disposed in parallel in a state of contact with each other.

2. The construction machine according to claim 1, wherein
a heat-insulating cover that surrounds said heater-equipped return pipeline and said normal suction pipeline together is provided between said urea water tank and said urea water pump.

3. The construction machine according to claim 1, wherein
said heater is heating wires that are wound on an outer circumference of said return pipeline.

* * * * *